March 12, 1940.    J. H. GUNNING    2,193,280
MECHANICAL COMPUTING DEVICE
Filed Dec. 4, 1937

Inventor
J. Henry Gunning
By Arthur P. Knight and
Alfred W. Knight
Attorneys

Patented Mar. 12, 1940

2,193,280

UNITED STATES PATENT OFFICE 2,193,280

MECHANICAL COMPUTING DEVICE

Joseph Henry Gunning, Los Angeles, Calif.

Application December 4, 1937, Serial No. 178,088

16 Claims. (Cl. 235—61)

The present invention relates generally to mechanical computing devices, and more particularly to calculating instruments of the portable type adapted to make specialized computations. With the particular arrangement of scales and graphs illustrated in connection with the preferred embodiment of my invention, it will be seen that my improved calculating device is especially useful with airplanes, and for this reason I describe it in that connection; but it will be understood that I am not limited by such description to that one use, for the computor may be adapted not only to any type of aircraft, including both heavier-than-air and lighter-than-air types, but also to water craft, such as surface ships and submarines, by the simple expedient of providing properly calibrated scales on the calculating mechanism, since the same general considerations and kind of calculations apply equally to both air and water craft.

In all craft suspended in air or water, the center of lift afforded by the surrounding fluid medium falls within certain well-defined limits according to design and construction. To properly balance a plane while in flight, it is necessary that the center of gravity of the plane also fall within definite limits in a fore-and-aft direction relative to the center of lift. Since the amount and distribution of dead weight is fixed, the location of the center of gravity of a loaded plane can be controlled to a large extent by the distribution of the loads carried in flight, such as fuel, oil, passengers, and cargo. If these loads are concentrated in the forward portion of the plane, the center of gravity may be moved too far forward, and then there is created a condition, termed "nose-heavy," in which the plane is so stable that it is unresponsive to the controls and hard to handle, especially in landing. If these loads are concentrated too far to the rear, the center of gravity may be moved so far rearwardly that the plane becomes "tail-heavy," in which condition it is unstable in flight. In either of these extreme conditions, the ship is dangerous to land and take off or to fly. It follows from these considerations that there is an optimum location of the center of gravity which produces the desired balance and the most favorable flying characteristics, and that this balance can be secured by proper distribution of the load and, to a certain extent, independently of the mass of the load.

The importance of proper balance is recognized by designers, pilots, and all persons charged with the responsibility for airplane flights, and the fore-and-aft limits within which the center of gravity must fall to properly balance a particular plane are defined by regulations governing commercial flights, which regulations are strictly enforced. To comply with safety and flight requirements, each plane is loaded at the start of a trip in a certain manner according to the nature and amount of the load carried. If the weight or distribution of the load changes, as by fuel consumed in flight or by charging or discharging cargo and passengers at intermediate points on the route, it may become necessary to redistribute all or part of the load to compensate for the changed conditions. Calculation, with reasonable accuracy, of the balance of a ship and the changes in distribution of load required to obtain a given balance, was formerly a long and tedious job by pencil and paper methods. In an attempt to expedite these computations, there have been devised various mechanical aids and computing mechanisms, but these have either been unable to carry out the entire computations necessary, or else have been heavy and expensive devices that cannot economically be furnished and carried in each plane, and often require care and skill in their operation beyond what may be reasonably expected of persons operating these devices.

The need is for an inexpensive, light-weight calculator that can be operated quickly and easily, with a high degree of accuracy by flight personnel, even with only a short period of instruction. A relatively inexpensive mechanical computing device weighing but a few ounces could be economically carried by each commercial airplane and be readily available for accurate computation of balance as any changes in loading occur, thus eliminating guesswork. Instruments thus available would enable the pilot to quickly determine the proper distribution of loads at any stops en route, and also to calculate any rearrangement of load that might be necessary at the end of a long flight as the result of fuel consumption, because oftentimes consumption of almost an entire load of fuel will have so changed the balance of the ship from what it was at the beginning of the flight that it is desirable to relocate some of the cargo or reseat some passengers in order to trim the ship for a safe landing, especially when landing "blind" or by instruments alone.

Hence, it becomes a general object of my invention to provide a mechanical computing device adapted to carry out mechanically a large part of the mathematical calculations required to determine the weight and balance of air or water craft under any given conditions of loading.

It is also an object of the invention to provide a mechanical computing device for these specialized and lengthy calculations, which is simple and easy to operate and yet will give the desired results with a high degree of accuracy.

Another object is to provide a computing device in which calculations for weight and balance can be carried out separately if desired but in a manner to cooperate with one another, and in which the calculations of either weight or balance are fully mechanical so that paper and pencil are not required.

An additional object of my invention is to provide a mechanical computor of the above character that is relatively inexpensive and light in weight so that it can be economically furnished and carried by each airplane.

These objects are attained in a mechanical computing device constructed according to my invention by providing a main body or base and a pair of members angularly movable with respect to each other and with respect to the body. The body carries a plurality of loading scales graduated in units of weight, there being preferably a separate scale for each general position of a load. The body also carries a plurality of graphs graduated in arbitrarily established units which represent a mathematical function of the units in the load scales, the shape of the graphs being such that the position of the center of the gravity of the ship with reference to a known datum can be read on them. Each of the two angularly movable members has an index which cooperates with the scales and graphs in order to carry on computations. One of the angularly movable members also carries a linear scale graduated in units of weight and cooperating with the graphs to calculate the final value of the balance when the plane is less than fully loaded. It is preferable, though not necessary, in order to avoid the use of pencil and paper in carrying on calculations, to provide two slides on the scale-carrying member to aid in keeping track of accumulated or gross weight of the airplane as various items of load are placed in the calculations, one of the slides carrying one or more scales cooperating with the scale on the member and the other of the slides carrying an index which facilitates cooperation between these scales, and which may also conveniently facilitate cooperation between the first mentioned scale on the member and the graphs on the main body.

How the above, as well as other, objects and advantages of my invention are attained, will be more clearly understood by reference to the following description and the annexed drawing, in which.

Figures 1, 2:
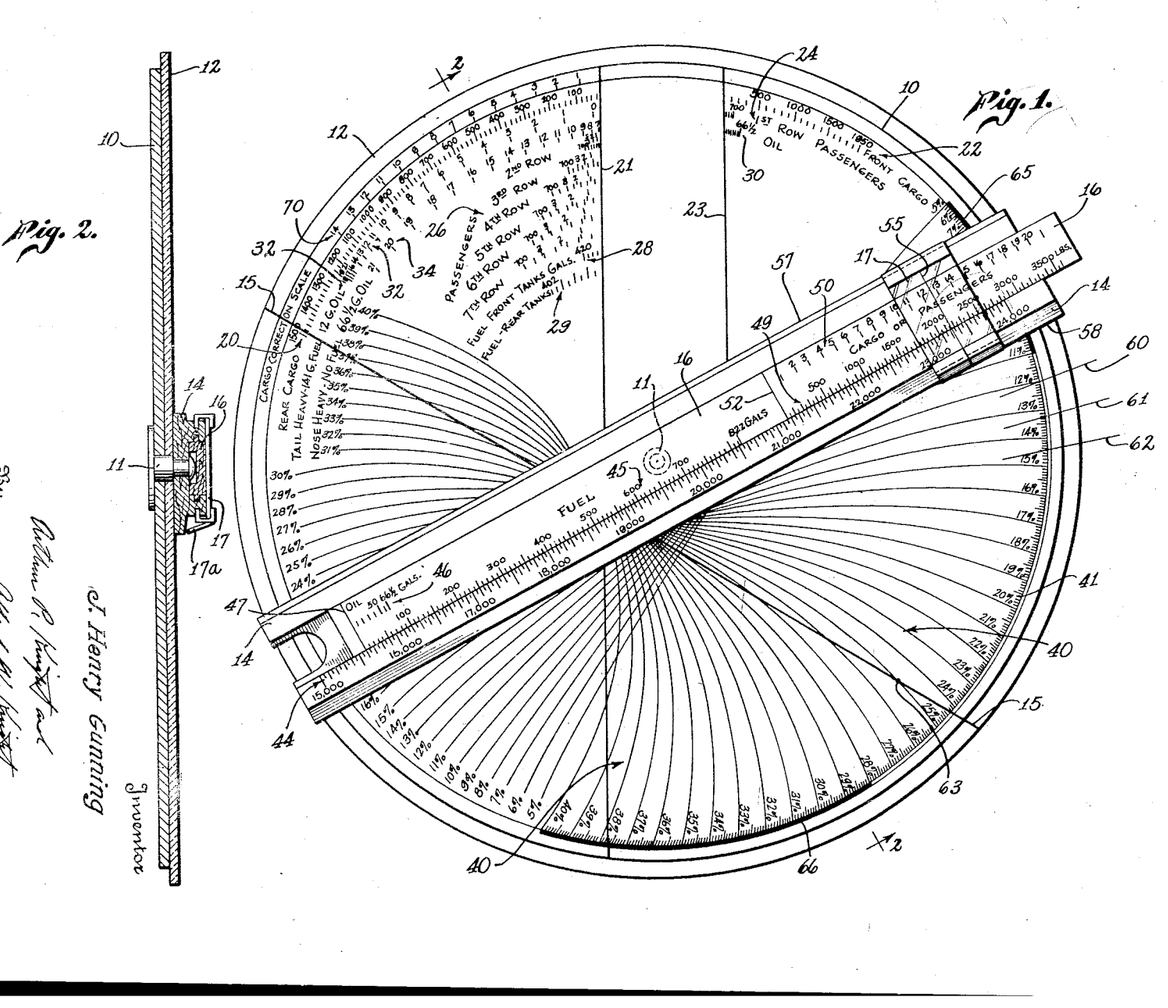
Fig. 1 is a plan view of a preferred embodiment of my invention.
Fig. 2 is a vertical section through the computing mechanism on line 2—2 of Fig. 1.

The base or main body 10 of the computing device is a flat, plate-like member of suitable shape, which is preferably circular in outline because it has been found convenient and advantageous to arrange the various scales and graphs on the computing device with reference to a central point or origin, which, in the preferred embodiment of my invention, is at the center of body 10. At the center of body 10 is a pivot post 11 by means of which two members are rotatably mounted on the body for angular movement with respect to the body and with respect to each other; one of these members is transparent disc 12 overlying body 10 and carrying an index line 15, and the other member is rule 14 on top of disc 12. It has been found convenient in operation of the computor to make member 12 in the form of a complete disc of a diameter slightly larger than the body, as the physical manipulation of the disc is easier in practice and index 15 can extend entirely across body 10. As will become apparent, disc 12 can, if desired, be replaced by members of other shapes, some of which may be of only sufficient size to carry index means 15 which need not extend entirely across the body 10. Rule member 14 also carries index means, as will be more fully described, and also preferably extends entirely across the diameter of body 10, but the rule is preferably relatively narrow so that as much as possible of the surface of body 10 is exposed to view.

Pivot 11 is here shown in the form of a rivet or the like, and preferably has a shoulder intermediate its length so that the rule will not bind upon the transparent disc and thus interfere with the free rotation of the three elements mounted upon the pivot.

The pair of slides 16 and 17 are mounted upon rule 14 for linear movement relative to each other and to the rule, the construction and arrangement of these three elements being similar to that of the conventional slide rule. Slide 16 is mounted for sliding movement by a tongue-and-groove connection within a recess in the body of the rule; while slide 17 corresponds to the usual hair-line indicator or runner of the ordinary slide rule. The two slides swing about pivot 11 with the rule so that they are capable of rotational movement with respect to members 10 and 12, the rule and two slides moving as a unit.

Before proceeding to a description of the various scales and graphs on the body of the computing mechanism, a brief description of the mathematical considerations involved and procedures followed will be given to facilitate understanding of the device and its operation. The basic principle of the general method used to determine the balance of any type of air or water craft involves calculating moments of the several masses involved about any suitable fixed reference line. In an airplane, which is the particular type of craft for which the computor illustrated is designed, the most convenient reference line is one passing transversely of the longitudinal axis of the ship and through the leading edge of the mean aerodynamic chord or the forward end of the structural mean chord. It will be clear that any weight located to the rear of this reference line causes a moment in one direction which counteracts the moment in the opposite direction caused by any weight located forward of this reference line; and for convenience of reference it may be arbitrarily established that masses to the rear of the reference line have a positive moment, while weights to the front of this reference have a negative moment.

It is, however, inconvenient to calculate the several moments in inch-pounds or in other similar conventional units of moments, because these values are such large numbers that they are not easily handled for our purpose. For this reason it is preferred to determine the value of each moment in arbitrary units, termed balance index units, rather than the actual moments. This is done by using the following formula, assuming the mean aerodynamic chord (M. A. C.) is used to determine the reference line:

$$\frac{w.d}{c.K} = B.I.$$

in which
    $w$ = the weight of any individual item or load.
    $d$ = distance of load $w$ from the reference line.
    $c$ = length of mean aerodynamic chord.
    $K$ = a constant.
    B. I. = balance index.

The balance index for each individual item of load is added to the balance index of the dead weight of the plane, calculated in the same manner, and the sum is the cumulative balance index, or C. B. I. which is then multiplied according to this formula:

$$C.B.I. \times \frac{K}{W} = \text{location of c. of g. in percent of M.A.C.}$$
$$W = \text{gross weight of loaded plane}$$

The constant $K$ may be any arbitrary number, but is preferably taken to be the maximum designed weight of the loaded plane so that it equals the summation of all weights $w$ of both dead and live load of a fully loaded plane. Use of a constant $K$ enables the balance index of each item of load to be obtained as a common mathematical function of each load item in arbitrary units of a common value that can be added to obtain a cumulative balance index. This summation of the balance index units is then finally multiplied by $$\frac{K}{W}$$

the ratio of the maximum designed load to the actual gross load. Obviously, for a fully loaded plane $K = W$ and $$\frac{K}{W} = 1$$

though this numerical relation does not hold true if $K$ is arbitrarily selected as some other value.

The balance index (B. I.) is a decimal fraction, but is conveniently and is hereinafter considered a percentage, and the final figure of the calculations is then the distance of center of gravity of the loaded plane from the reference line measured as a percentage of the length of the mean aerodynamic chord. Of course the same steps of calculation with different constants would produce a result locating the center of gravity by reference to another datum or in different units.

From calculations carried out by the designers of the particular airplane in question, certain constants can be determined that furnish data for calibrating the scales on the computor and serve as a starting point for using my computor to calculate the balance of any given plane. This starting point involves two known constants. One is the dead weight of the ship in pounds or other weight units, and the other is the initial balance index, as calculated above, of the unloaded plane. By the mathematical steps outlined above, the balance index is established for each of the several weights going to make up the total load of the plane, each of these index values having a positive or a negative sign according as the weight of which they are a function produces a positive or a negative moment. The balance index of each weight is added algebraically to the initial balance index of the unloaded plane to obtain the cumulative balance index.

The long and tedious computations that are involved in the arithmetical calculations of all of the desired values, are eliminated by carrying out these calculations mechanically with the aid of my computor. Scales representing the weights of the various items of load carried are located in the upper portion of the top face of body 10 as viewed in Fig. 1. These scales are preferably laid out along arcuate lines with the center of curvature at pivot 10 though the scale markings are not exactly radial, because readings on these arcuate scales are made with the aid of rule 14. Taking up these scales in sequence, the first scale 20, placed near the rim of body 10, is labeled "Rear cargo" and is graduated in pounds, the smallest scale division being a unit of 20 pounds. The zero point or base line at which this scale commences is the heavy straight line 21, and since rear cargo produces a positive moment, this scale has been assigned a position to the left of this base line. A similar scale 22 is placed at the same position adjacent the rim of body 10 for "Front cargo" and is likewise graduated in pounds. The zero point or base line at which this scale commences is the heavy line 23, and since front cargo produces a negative moment in the calculations, this scale has been assigned a position to the right of base line 23.

The next scale inwardly is that at 24 marked "1st row passengers", representing the passengers carried in the first row of seats. This scale has its zero point on the common base line 23. The other passengers carried by the plane are represented by a series of scales at 26 which all have a common zero point on base line 21 and extend to the left therefrom. The scales 26 are marked, respectively, "2nd row," "3rd row," "4th row," "5th row," "6th row," and "7th row," thus indicating the row of seats in which the passengers are located. All these scales are likewise calibrated in units of weight. The smaller scale divisions in each of scales 24 and 26 indicate a weight unit, as 100 pounds; but for purposes of convenience larger divisions are also furnished on scales 26 marked with the numbers 1, 2, and 3, indicating the weight of one, two, or three passengers seated in that row of seats, the latter scale divisions being based upon the assumption that a single passenger weighs 170 pounds. The moment produced by the passengers is positive or negative according to the seat row, and this determines the position of scales 24 and 26 relative to base lines 21, 23.

Positioned inwardly from scales 26 are scales 28 and 29 each having their zero point on the common base line 21 and extending to the left from the base line since both loads of fuel represented by these scales create positive moments. The scale 28 represents the fuel in the front tanks and scale 29 represents the fuel carried in the rear tanks. These scales are both graduated actually in weight units, but the scales read directly in gallons of fuel in order to save the labor of converting the gallonage to pounds, and the main scale divisions, except the terminal one, correspond each to 100 gallons of gasoline, according to the markings on the scales. The oil carried creates a negative moment about the assumed reference line; and the weight value of this item is represented by scale 30 with its zero point on base line 23 and extending to the right therefrom. Each subdivision on this latter scale represents the weight of ten gallons of lubricating oil.

Two auxiliary scales are placed at 32 and 34 for the purpose of facilitating certain specialized operations, the nature of which will be more fully explained later. All the scales and graphs on body 19, as well as the scales later described on members 14 and 16, may be marked on the computor by any desired process, as by engraving, stamping, and the like, or the scales may be printed on sheet material, such as paper, Celluloid, and other substances, the sheets being cemented to the various elements of the computor.

Each of the various scales described represents a weight with a different fixed position in the airplane; and a plurality of scales, one for each position, is required since one scale can represent only one variable weight at a fixed mean distance from the reference line about which moments are taken. Obviously, the farther away from the reference line the center of mass of a given weight is, the greater the resultant moment, and as a consequence the larger the scale division representing graphically that weight along a scale at any given radius. The scales with the smaller divisions, as determined by moments alone, are preferably placed toward the outer rim of body 10, since scale divisions are enlarged in proportion to the distance that they are removed from the center 11 of the computor. Otherwise, the sequence of arranging the scales on the base of body 10 may be any desired.

The balance of the plane, expressed in balance index units which are a function of any given load and its position in the ship, is represented by the graphs 40 placed on the lower portion of the body face as seen in Fig. 1. These graphs are plotted using polar coordinates with pivot 11 as the center, but must be corrected when the index cooperating with them is not exactly radial, which is the case here as will be seen. The scale for reading these index units is circular scale 41 around the rim of body 10. Starting with a given balance index of the dead weight alone of the unloaded plane, the cumulative balance may be kept on graph 40 by adding algebraically the several individual balance indexes obtained from calculating the effect of the several loads in the plane.

On the face of rule 14 is a linear scale 44 graduated in pounds or other similar weight units, which is adapted to record the cumulative weight of the ship as the individual loads considered are added to the total. As will be clear from later description, scale 44 may be on either member 12 or 14, for it could be placed on the face of disc 12 adjacent index 15. The range of this scale is from a point slightly below the unloaded or dead weight of the ship up to the maximum weight designed for the loaded plane. On slide 16 there is a plurality of linear scales representing the units of weight of various items of the load and adapted to cooperate with scale 44. Thus, scale 45 is graduated in gallons representing the fuel carried by the plane, and scale 46, likewise graduated in gallons, represents the load of oil carried. Both of these scales have a common zero or base line 47. Scale 49 represents pounds of cargo or passengers carried, while scale 50 represents the number of passengers, each scale division representing one person. Both of these latter scales have a common base line 52 as their zero point. Cargo scale 49, like scale 44, is graduated in pounds; but the oil, fuel, and passenger scales are graduated in gallons or number of persons, since these are the items of the load, and by graduating the scales in this way the labor of converting the load items into pounds is saved.

Slide 17 which moves longitudinally on rule 14 is preferably a conventional style hairline indicator and as such comprises a transparent top plate carrying hairline 55 or other index means that facilitates setting values or readings on the scales of slide 16 with reference to scale 44 on the rule. As shown in Fig. 2, one end of slide 17 preferably extends at 17a down over the side of the rule so that hairline 55 may be located with reference to graphs 40 for the purpose of transferring a reading from scale 44 onto the graphs to locate the final point whose value is to be determined, as will be more fully explained.

Rule 14 is provided with suitable index means cooperating with the load scales on the face of body 10 to effect computations with the calculator. This index means may take any particular form desired, but, in the embodiment of the computor illustrated, comprises the upper and lower parallel edges, 57 and 58 respectively, of rule 14. These two parallel edges do not extend exactly radial of body 10, since they do not pass through the center of pivot 11, but do extend in a direction generally radial of the body. These index edges on the rule determine the locations of base lines 21 and 23, and index 15 on the disc 12 which extend across body 10 in a direction generally radial thereof. The perpendicular distances of index 57 and line 21 from the center of pivot 11 are equal in order that, by rotation of the rule, edge 57 can be brought into exact coincidence with the entire length of base line 21. To obtain a similar result, base line 23 and index 15 are the same perpendicular distance from pivot 11 as index edge 58. Base line 23 is parallel to base line 21 and separated therefrom by an amount exactly equal to the distance between indexes 57 and 58, so that when edge 57 coincides with base line 21, index 58 coincides with base line 23. This arrangement is preferred because it leaves a maximum portion of the scales uncovered and visible at all times, but it will be readily understood that, were base lines 21 and 23 moved into exact coincidence to form but a single line in the present position of either one of them, then only a single index means on rule 14 would be needed and either edge 57 or 58 might be used, according to the position of the base or zero line of the scales on the face of the body.

It is believed that a further understanding of the construction and operation of the computor will best be had by following through the several operations of an actual example of calculation, and so there will now be explained the individual steps taken and settings made of the various elements of the computor to work out a typical problem. Assume the following data:

*Table A*

|  | Weight in pounds | Cumulative weight | Balance index | Cumulative balance index |
|---|---|---|---|---|
| Dead weight (unloaded plane) | 15,430 | 15,430 |  |  |
| Two pilots | 340 | 15,770 |  |  |
| Stewardess | 130 | 15,900 |  |  |
| Buffet supplies, etc. | 100 | 16,000 |  |  |
| Basic weight | 16,000 | 16,000 | 12.02 | 12.02 |
| Fuel: |  |  |  |  |
| 420 gals. front | 2,520 | 18,520 | 1.22 | 13.24 |
| 180 gals. rear | 1,080 | 19,600 | 1.68 | 14.92 |
| Oil, 50 gals | 380 | 19,980 | −0.45 | 14.47 |
| Passengers: |  |  |  |  |
| 2 in 3rd row | 340 | 20,320 | 0.70 | 15.17 |
| 2 in 5th row | 340 | 20,660 | 1.50 | 16.67 |
| 3 in 7th row | 510 | 21,170 | 3.45 | 20.12 |
| Cargo: |  |  |  |  |
| Front | 1,350 | 22,520 | −3.60 | 16.52 |
| Rear | 800 | 23,320 | 7.76 | 24.28 |
| Loaded weight | 23,320 |  |  | 24.28 |
| Balance index of total load (exclusive of basic weight) |  |  | 12.26 |  |

The dead weight of the unloaded plane is of course known and can be furnished by the manufacturer. To this figure there is then added the weight of the crew, comprising two pilots and a stewardess; and also the weight of buffet supplies and the like which are carried on each flight. This last figure should also include any additional items carried on the flight, such as additional radio equipment, signal or navigating equipment, parachutes, and the like. These items of constant, or substantially constant value are added to the dead weight of the ship and there is obtained a value of 16,000 pounds which is termed the basic weight. Since the items of this basic weight may be considered as constant, not only for an entire flight but usually for all flights, the basic weight rather than the dead weight of the unloaded plane most conveniently forms the starting point of our calculations. A plane loaded with these basic items of course has a definite and constant balance so that the manufacturer can calculate and furnish as a constant for that particular plane a balance index for the basic weight of 16,000 pounds. In the typical ship of our problem this initial balance index is 12.02.

The problem now is to compute the weight and balance of the airplane when loaded with fuel, oil, passengers, and cargo, in the amounts and distribution shown in the above table. The weight in pounds of these various items has been entered in the table, and likewise, the balance index of each individual item of the load has been entered, though these particular figures do not appear as such in our actual computations. In both instances the desired result, and the one shown by the computor, is the cumulative weight and the cumulative balance index given in the second and fourth columns respectively.

Although the sequence of operations may be varied considerably and is not necessarily fixed, the particular sequence described below has been selected because it most simply and clearly illustrates the nature and results of the computations. Hence, for the purpose of example, the first series of computations will be to calculate the loaded weight of the plane, and the cumulative weight as each of the items of load is added will be shown.

First place base line 47 above 16,000 pounds on scale 44, this value being the basic weight of the ship. The total weight of fuel is 600 gallons, and to add the fuel, index 55 on slide 17 is moved to the right until it coincides with the figure 600 on fuel scale 45. The position of index 55 on scale 44 then indicates the cumulative load with this item to be 19,600 pounds. Leaving slide 17 stationary, slide 16 is moved to the right to bring base line 47 into coincidence again with index 55. Slide 17 is next moved to the right to bring index 55 over the value 50 on oil scale 46. The cumulative weight is read on scale 44 underneath index 55 and is 19,980 pounds.

Again leaving slide 17 stationary, slide 16 is moved to the left until base line 52 registers with index 55. The total number of passengers carried being 7, index 55 is brought into coincidence with the figure 7 on scale 50 and the cumulative weight of 21,170 pounds is read on scale 44 at the setting of index 55. Base line 52 is then set to the value of 21,170 pounds, which places it in the position shown in Fig. 1, and the total cargo load is added in by moving slide 17 to the right to bring index 55 to the value of 2,150 pounds on scale 49, as shown in Fig. 1. Index 55 indicates that the cumulative loaded weight of the plane is now 23,320 pounds, which figure will be termed the loaded weight. The operations described have been in the nature of addition to arrive at the total weight of the plane when loaded, but so far do not indicate what the balance of the ship may be when in this loaded condition.

The steps taken to determine the cumulative balance index will now be considered. To make the initial settings, members 12 and 14 are turned individually about pivot 11 until index 15 crosses scale 41 at a value of 12.02 as at 60 in Fig. 1, and edge 57 of the rule is in coincidence with base line 21. The first calculation is to determine the change in balance resulting from the addition of 420 gallons of fuel to the front tanks, and this is accomplished by first rotating rule 14 counter-clockwise until index edge 57 coincides with the value 420 on fuel scale 28, while at the same time holding body 10 and disc 12 firmly between the fingers so that no relative movement of these two elements can take place. The second step in the calculation is to release body 10 and disc 12 and instead hold rule 14 and disc 12 together against relative movement. Next, rule 14 and disc 12 are rotated clockwise until index 57 coincides with base line 21 again, when it will be found that this last movement has advanced index 15 to a reading of 13.24 on scale 41, as at 61 in Fig. 1. This value is the cumulative balance index as shown in the table above; and the balance index of 1.22 for the fuel can be obtained if it is desired for any reason by subtracting from the last-obtained cumulative value the original value of 12.02.

The balance index with 180 gallons of fuel in the rear tanks is computed by moving rule 14 only counterclockwise so that index 57 is moved angularly from coincidence with base line 21 to the value of 180 on fuel scale 29, while at the same time disc 12 is held against movement relative to base 10. Next is repeated the step of releasing the disc and base, and clamping rule 14 and disc 12 against relative movement while the rule and disc are moved in a clockwise direction until index 57 again coincides with base line 21. At the completion of this operation index 15 shows a reading of 14.47 on scale 41, as at 62 in Fig. 1.

The remaining load items of 50 gallons of oil, two passengers in the third row of seats, two passengers in the fifth row of seats, three passengers in the seventh row of seats, 1,350 pounds of cargo in the front compartment, and 800 pounds of cargo in the rear compartment are each treated in a similar manner. Determination of the cumulative balance index as each of these items is added involves, first, an angular movement of rule 14 alone away from the position of coincidence of a rule index with a base line on the body, until the rule index coincides with the value desired on the corresponding load scale; second, clamping disc 12 and rule 14 against relative movement; and, third, moving disc 12 and rule 14 together to return rule 14 to the starting position in which its index registers again with the base line. The last movement of course moves index 15 with relation to graphs 40 and scale 41.

The two calculations described previously in detail were to determine the balance created by positive moments. It will be noted from Fig. 1 and from the above tabulation of the example being worked, that the loads of oil and of cargo in the front compartment both produce negative balance indexes. In calculating the effect of these loads, manipulation of the various elements of the computor differs from the foregoing simply in that the first movement of rule 14 is in a clockwise direction, from an initial position in which index 58 is in alinement with base line 23, to a position in which index 58 coincides with the corresponding value on scales 22 or 30. Movement of rule 14 and disc 12 counterclockwise to restore the rule to its initial position, moves index 15 in a counterclockwise or negative direction with respect to scale 41, and operates to subtract the balance index of that particular load from the cumulative balance index.

At the completion of these several manipulations, index 15 occupies the position shown in Fig. 1, and crosses scale 41 at a cumulative balance index of 24.28. To obtain the final balance, it is necessary to multiply the cumulative balance index by the ratio K/W, and this is accomplished by rotating rule 14 clockwise until index 58 coincides with index 15, index 55 remaining at the setting of 23,320 on scale 44, as this value is W of the ratio. In this position, the point on index 15 where index 55 meets or intersects the former is easily determined from the end of index 55 on slide portion 17a, and is indicated at 63 in Fig. 1. This is the final point whose value is desired, and whose position with reference to graphs 40 gives the final balance of the loaded plane. The value of point 63 is found by reference to scale 41 which indicates that it lies almost exactly on line 25, so that the final value may be taken as 25%. This final reading from the calculations indicates that the loaded plane, weighing 23,320 pounds, balances at a point, that is, has its center of gravity at a point, which is located to the rear of our assumed reference line, through the leading edge of the mean aerodynamic chord, by a distance equal to 25.0% of the mean aerodynamic chord. When the actual loaded weight equals the maximum designed weight of 24,000 pounds, the ratio K/W equals 1, and the final value of the balance is read directly on the scale 41. When the load is less than maximum, index units are converted to actual percentage units by reading with reference to graphs 40 the value at the intersection of indexes 15 and 55, the first index being set to the cumulative balance index and the latter at the actual loaded weight. Consequently, the relation of scales 44 and 41 is such that when index 55 is set at 24,000 pounds on scale 44, the index intersects index 15 at the arc of scale 41.

The above-described sequence of steps is not necessarily fixed and may be altered as desired. One variational method is to alternately calculate the cumulative weight and the cumulative balance index for each item of load, so that as each load item is placed in the calculations, the person operating the computor knows exactly the total loaded weight of the plane as well as the balance index for all loads considered up to that point. When this is done, the above-described mechanical manipulations of the various elements of the computor are made, except that the sequence of the several steps is changed according to the sequence of the items which it is wished to compute.

Regulations governing the flights of airplanes generally prescribe that the balance of the ship must fall within certain definite limits, these limits being set as fractions or percentages of the mean aerodynamic chord. In the example worked, it may be assumed that regulations prescribed that the balance, that is, the center of gravity, must fall between 11% and 28% of the mean aerodynamic chord. As a visual guide so that the pilot can keep these limits in mind at all times, it is convenient to mark or block off in some manner that portion of scale 41 below 11%, as indicated at 65, and also that portion of scale 41 above 28%, as indicated at 66. This may conveniently be done by coloring red the portions of body 10 at 65 and 66 along the outside of scale 41, which serves as a warning that loads bringing the final balance into these red zones are not allowed according to regulations.

Certain auxiliary scales are provided that permit short cuts in calculations so that the pilot may quickly determine the desired distribution of cargo or passengers to produce a predetermined position of the center of gravity of the loaded plane. One of these is scale 70 located adjoining the cargo scale 20 and marked "Cargo correction scale". The manner of using this scale is as follows: Assume that in the previous problem, the pilot wishes to distribute 2,150 pounds of cargo in such a manner that a final balance of exactly 25% will be obtained. As the first step in the calculation, he assumes that some definite amount, such as 1,000 pounds, of this total load is placed in the rear compartment and the remainder, 1,150 pounds, is placed in the front cargo compartment. Computation of the balance of the plane, using these values, gives a cumulative balance index of 26.8%, so that the final actual balance is approximately 27.6%. Leaving index 15 at 26.8% on scale 41, which is the cumulative balance index resulting from the computations, and placing index 55 at the total loaded weight of 23,320 pounds on scale 44, the next operation is to turn rule 14 clockwise until the intersection of index 58 and index 55 falls exactly upon the curved line in graphs 40 having a value of 25%. This will, of course, be the point 63 reached in our previous example. Index 58 then gives a reading on scale 41 of 24.28%.

Subtracting the index value of 24.3% from the index value first obtained of 26.8%, the difference is found to be 2.5%. By turning scale 14 until index 57 coincides with the value of 2.5 on scale 70, index 57 gives a reading of approximately 200 pounds on cargo scale 20. This indicates that 200 pounds of cargo should be moved from the rear compartment to the front compartment in order to obtain the desired balance. A check on the correctness of this computation, starting with index 15 at 26.8 on scale 41, is easily had by placing index 58 at a value of 200 pounds on front cargo scale 22, holding rule 14 and disc 21 against relative movement, and moving them both counterclockwise until index 57 intersects cargo scale 20 at a value of 200 pounds. This counterclockwise movement of disc 12 and index 15 effects the change in the cumulative balance index resulting from adding 200 pounds of cargo to the front compartment and subtracting an equal amount from the rear cargo compartment, and it will be found that index 15 has moved on scale 41 from its former position of 26.8% to a new value of 24.3%. The final balance of the ship, computed in the manner previously described, will then be found as exactly 25%.

Another of these auxiliary scales is scale 32 which is marked "Tail-heavy". Considering a load of gasoline and oil only, a maximum tail-heavy condition occurs under normal flight circumstances with 141 gallons of gas in the front tanks and 12 gallons of oil, and scale 32 has this additional information noted opposite it. By the use of this scale, it is possible to obtain directly the cumulative balance index for any number of passengers added to this given load of fuel and oil, only one setting of the elements of the computor being required for this calculation. For example, assume that there are six passengers seated in the last two rows of seats. The initial setting is with index 57 at scale division 6 on scale 32, and index 15 at 12.0% on scale 41, since this value is the balance index of the basic load. Rule 14 and disc 12 are then held together and moved clockwise until index 57 registers with base line 21. This movement advances index 15 to a value of 19.6 on scale 41, which is the cumulative balance index with 141 gallons of gasoline, 12 gallons of oil, and 6 passengers in the last two rows of seats. Any cargo carried changes the balance index, and its effect is calculated as described above. Of course, this same result can be arrived at by adding in all the individual items in the manner previously described.

A similar auxiliary scale is the one noted at 34 and marked "Nose-heavy". Without considering other load, this condition occurs with no fuel and a full load of oil, and this information is marked adjacent scale 34. If the pilot wishes to know what change will be made in the balance index from this nose-heavy condition by the addition of a given number of passengers, the resulting balance index may be determined by a single setting of the elements of the computor. Starting with index 15 at a value of 12.0 on scale 41, index 57 is set on scale 34 to the desired number of passengers, which for this example will be assumed to be 9, distributed equally in the first three rows of seats. Movement of rule 14 and disc 12 simultaneously in a clockwise direction until index 57 coincides with base line 21 advances index 15 to a reading of 12.8 on scale 41 which is the cumulative balance index for this loading. It will be clear from an examination of the various load scales that passengers in the first row of seats and the load of oil are approximately counterbalanced by passengers in the second row of seats, so that it is not until 7 or more passengers are carried that there is sufficient decrease in the nose-heavy condition to bring about an increase in the index balance over the basic weight value of 12.0; and for this reason scale 34 has the graduation indicating 7 passengers at approximately the same position as base line 21. If the condition for less than 7 passengers is desired, it will result in an index value less than 12.0 and may be computed from the various elements of the load according to the procedure previously described. The final balance is computed for either "nose-heavy" or "tail-heavy" conditions, after the use of scales 32 and 34, by calculating the cumulative weight in scale 44, setting index 55 to this value, and finding the balance on graphs 40 with the aid of index 55, as described above.

Having described a preferred embodiment of my invention, it will be apparent that changes in the shape and arrangement of the various physical members of the computor, changing location of pivot 11 to positions other than the center of body 10, and changes in the position and location of the various scales and graphs, will occur to those skilled in the art without any departure from the spirit and scope of my invention, and consequently, it is to be understood that the foregoing disclosure is to be construed as illustrative of, rather than restrictive upon, the appended claims.

I claim:
1. A mechanical computing device comprising a body; a first member and a second member angularly movable with respect to each other and with respect to the body; a plurality of scales and graphs on the body, the graphs representing a mathematical function of the scale quantities; an index on one of said members extending in a direction to intersect the graphs; and a scale on one of said members cooperating with the index to locate on the graphs a point whose value is desired.

2. A mechanical computing device comprising a body; a first member and a second member angularly movable with respect to each other and with respect to the body; a plurality of scales and graphs on the body, the graphs representing a mathematical function of the scale quantities; an index on one of said members extending in a direction to intersect the graphs; and a scale on the other of said members cooperating with the index to locate on the graphs a point whose value is desired.

3. A mechanical computing device comprising a body; a first member and a second member angularly movable with respect to each other and with respect to the body; a plurality of scales and graphs on the body, the graphs representing a mathematical function of the scale quantities; indexes on each of said members extending across the body, the index on one member being movable over said scales and the index on the other member being movable over said graphs to locate points thereon; and a scale on one of said members cooperating with one of said indexes to locate on the graphs a point whose value is desired.

4. A mechanical computing device comprising a body; a first member and a second member angularly movable with respect to each other and with respect to the body; a plurality of scales and graphs on the body, the graphs representing a mathematical function of the scale quantities; indexes on each of said members extending across the body, the index on one member being movable over said scales and the index on the other member being movable over said graphs to locate points thereon; and a scale on the one of said members movable over the body scales and cooperating with an index on the other of said members to locate on the graph a point whose value is desired.

5. A mechanical computing device comprising a body; a first member and a second member angularly movable with respect to each other and with respect to the body; a plurality of scales and a plurality of graphs on the body, the scales having a common base line extending outwardly toward the periphery of the body; an index on the first member; an index on the second member movable into registration with the base line on the body; the second member and associated index being adapted by angular movement from the position of the body base line to measure along said scales certain quantities, and the first member and associated index being adapted to indicate on said graphs the accumulated resultant movement of a series of such measurements.

6. A mechanical computing device comprising a body; a first member and a second member angularly movable with respect to each other and with respect to the body; a plurality of scales representing different quantities having a common unit of measurement and a plurality of graphs on the body representing a common mathematical function of the several scales, the scales having a common base line extending outwardly toward the periphery of the body; an index on the first member; an index on the second member movable into registration with the base line on the body; the second member and associated index being adapted by angular movement from the position of the body base line to measure with said scales certain quantities, and the first member and associated index being adapted to indicate on said graphs the accumulated value of the mathematical functions of a series of such measurements.

7. A mechanical computing device comprising a body; a first member and a second member angularly movable with respect to each other and with respect to the body; a plurality of scales and a plurality of graphs on the body, the scales having a common base line extending outwardly toward the periphery of the body; an index on the first member; an index on the second member movable into registration with the base line on the body; the second member and associated index being adapted by angular movement from the position of the body base line to measure along said scales certain quantities, and the first member and associated index being adapted to indicate on said graphs the accumulated resultant movement of a series of such measurements; and a scale on the second member cooperating with the index on the first member to locate on the graph a point whose value is desired.

8. A mechanical computing device comprising a body; a first member and a second member angularly movable with respect to each other and with respect to the body; a plurality of scales representing different quantities having a common unit of measurement and a plurality of graphs on the body representing a common mathematical function of the several scales, the scales having a common base line extending outwardly toward the periphery of the body; an index on the first member; an index on the second member movable into registration with the base line on the body; the second member and associated index being adapted by angular movement from the position of the body base line to measure with said scales certain quantities, and the first member and associate index being adapted to indicate on said graphs the accumulated value of the mathematical function of a series of such measurements; and a scale on the second member graduated in a unit of measurement common to the scales on the body and cooperating with the index on the first member to locate on the graph a point whose value is desired.

9. A mechanical computing device comprising a body; a pair of members pivotally mounted on the body for rotational movement relative to each other and to the body; a plurality of scales and graphs on the body; a scale on one of the members cooperating with the scales and graphs on the body; index means on both of said members cooperating with said scales and graphs; a pair of slides mounted on said scale-carrying member for linear movement relative to each other and to the member; a scale on one of the slides; and index means on the other slide cooperating with the scales on the other slide and on the scale-carrying member and with the graphs on the body.

10. A mechanical computing device comprising a body; a plurality of scales and graphs on the face of the body; a rule pivotally mounted on the body to rotate relative thereto; a transparent disc between the rule and body and pivoted to rotate relative to either the rule or body; an index on the disc; a slide member mounted on the rule for linear movement relative thereto; cooperating linear scales on the slide and rule; and an index member mounted on the rule for linear movement relative to the rule and slide and cooperating with the rule scale and body graphs to locate a point on the graphs whose value is desired.

11. A mechanical computing device comprising a substantially circular, plate-like body; a plurality of arcuate scales and graphs on the face of the body; a relatively narrow, elongated rule pivotally mounted at the center of the body to rotate relative thereto; index means on the rule; a transparent disc between the rule and body and pivoted to rotate relative to either the rule or body; an index on the disc in a position to be alined with said index means on the rule; a slide member mounted on the rule for linear movement relative thereto; cooperating linear scales on the slide and rule, the scale on the rule extending substantially entirely across the body; and an index member mounted on the rule for linear movement relative to the rule and slide and cooperating with the rule scale and body graphs to locate a point on the graphs whose value is desired.

12. A mechanical computing device for calculating the balance of loaded air craft and the like, comprising a body; a plurality of arcuate load scales on the body graduated in weight units, each scale indicating a load at a different position in the craft; a plurality of graphs on the body graduate in arbitrarily established units of a function of moments of the loads represented by said scales; a pair of members pivotally mounted on the body for rotational movement relative to the body and to each other; index means on one of the members cooperating with the body scales and graphs; a linear scale on the other of said members graduated in weight units; a pair of slides mounted on said second mentioned member for linear movement relative to the second member and to each other; a linear scale on one of the slides graduated in weight units and cooperating with the linear scale on the second mentioned member; and index means on the other slide cooperating with the linear weight scales and with the graphs to obtain a reading on the graph indicating the balance of the craft for a loaded weight shown on one of the linear scales.

13. A mechanical computing device for calculating the balance of loaded air craft and the like, comprising a body; a plurality of arcuate load scales on the body graduated in weight units, each scale indicating a load at a different position in the craft; a plurality of graphs on the body graduated in arbitrarily established units of a function of moments of the loads represented by said scales; a pair of members pivotally mounted on the body for rotational movement relative to the body and to each other; index means on both of the members cooperating with the body scales and graphs; a linear scale on one of said members graduated in weight units; a pair of slides mounted on said one member for linear movement relative to the one member; a linear scale on one of the slides graduated in weight units and cooperating with the linear scale on said one member; and index means on the other slide cooperating with the linear weight scales and with the graphs to obtain a reading on the graph indicating the balance of the craft for a loaded weight shown on one of the linear scales.

14. A mechanical computing device for calculating the balance of loaded air craft and the like, comprising a body; a plurality of arcuate load scales on the body graduated in weight units, each scale indicating a load at a different position in the craft; a plurality of graphs on the body graduated in arbitrarily established units of a function of moments of the loads represented by said scales; a pair of members pivotally mounted on the body for rotational movement relative to the body and to each other; index means on one of the members cooperating with the body scales and graphs; a linear scale on the other of said members graduated in weight units; a pair of slides mounted on said second mentioned member for linear movement relative to the second member and to each other; a linear scale on one of the slides graduated in weight units and cooperating with the linear scale on the second mentioned member; index means on the other slide cooperating with the linear weight scales and with the graphs to obtain a reading on the graph indicating the balance of the craft for a loaded weight shown on one of the linear scales; and a scale on the body adjacent one of the load scales and graduated in units of the graph to indicate the amount of load represented by said load scale to be changed in position to secure a given change in readings obtained on the graphs.

15. A mechanical computing device comprising a body; a plurality of scales and graphs on the face of the body; a rule pivotally mounted on the body to rotate relative thereto; a transparent disc between the rule and body and pivoted to rotate relative to either the rule or body; an index on the disc; a linear scale on the rule; and an index member mounted on the rule for linear movement relative to the rule and cooperating with the rule scale and body graphs to locate a point on the graphs whose value is desired.

16. A mechanical computing device comprising a substantially circular, plate-like body; a plurality of arcuate scales and graphs on the face of the body; a relatively narrow, elongated rule pivotally mounted at the center of the body to rotate relative thereto; index means on the rule; a transparent disc between the rule and body and pivoted to rotate relative to either the rule or body; an index on the disc in a position to be alined with said index means on the rule; a linear scale on the rule extending substantially entirely across the body; and an index member mounted on the rule for linear movement relative to the rule and cooperating with the rule scale and body graphs to locate a point on the graphs whose value is desired.

J. HENRY GUNNING.

CERTIFICATE OF CORRECTION.

Patent No. 2,193,280.

March 12, 1940.

JOSEPH HENRY GUNNING.

It is hereby certified that error appears in the printed specification of the above numbered patent requiring correction as follows: Page 4, first column, line 59, for "cale" read scale; page 8, first column, line 13, claim 6, for the word "functions" read function; and second column, line 36, claim 12, for "graduate" read graduated; and that the said Letters Patent should be read with this correction therein that the same may conform to the record of the case in the Patent Office.

Signed and sealed this 30th day of April, A. D. 1940.

(Seal)

Henry Van Arsdale,
Acting Commissioner of Patents.